United States Patent
Tetrick

(10) Patent No.: US 8,127,294 B2
(45) Date of Patent: Feb. 28, 2012

(54) DISK DRIVE FOR HANDLING CONFLICTING DEADLINES AND METHODS THEREOF

(75) Inventor: R. Scott Tetrick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1313 days.

(21) Appl. No.: 11/751,868

(22) Filed: May 22, 2007

(65) Prior Publication Data

US 2008/0295099 A1    Nov. 27, 2008

(51) Int. Cl.
*G06F 9/46* (2006.01)
*G06F 13/00* (2006.01)

(52) U.S. Cl. ........................................ 718/102; 711/100

(58) Field of Classification Search .................. None
See application file for complete search history.

(56) References Cited

U.S. PATENT DOCUMENTS 6,871,011 B1 * 3/2005 Rahman et al. ............... 386/293
2006/0123167 A1 * 6/2006 Jeppsen et al. ................ 710/106

FOREIGN PATENT DOCUMENTS

CA            2275826 A1 * 12/2000

* cited by examiner

*Primary Examiner* — Kenneth Tang
(74) *Attorney, Agent, or Firm* — Grossman, Tucker, Perreault & Pfleger, PLLC

(57) ABSTRACT

Disclosed is a method for handling conflicting deadlines by a disk drive. The method comprises: receiving a plurality of requests from a plurality of applications for accessing the disk drive; determining a plurality of service times for the plurality of requests; serving a first request of the plurality of request prior to an actual schedule when a deadline for serving the first request and a deadline for serving a subsequent request of the plurality of requests cannot be simultaneously met by the disk drive; and serving the subsequent request after the first request is served by the disk drive.

12 Claims, 3 Drawing Sheets

DISK DRIVE FOR HANDLING CONFLICTING DEADLINES AND METHODS THEREOF

FIELD

The present disclosure relates to conflicting deadlines of requests from applications accessing a disk drive, and, more particularly, to handling of conflicting deadlines of requests from applications accessing a disk drive, thereby improving the performance of the disk drive.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DISCLOSURE

For a thorough understanding of the present disclosure, refer to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

Figure 1:
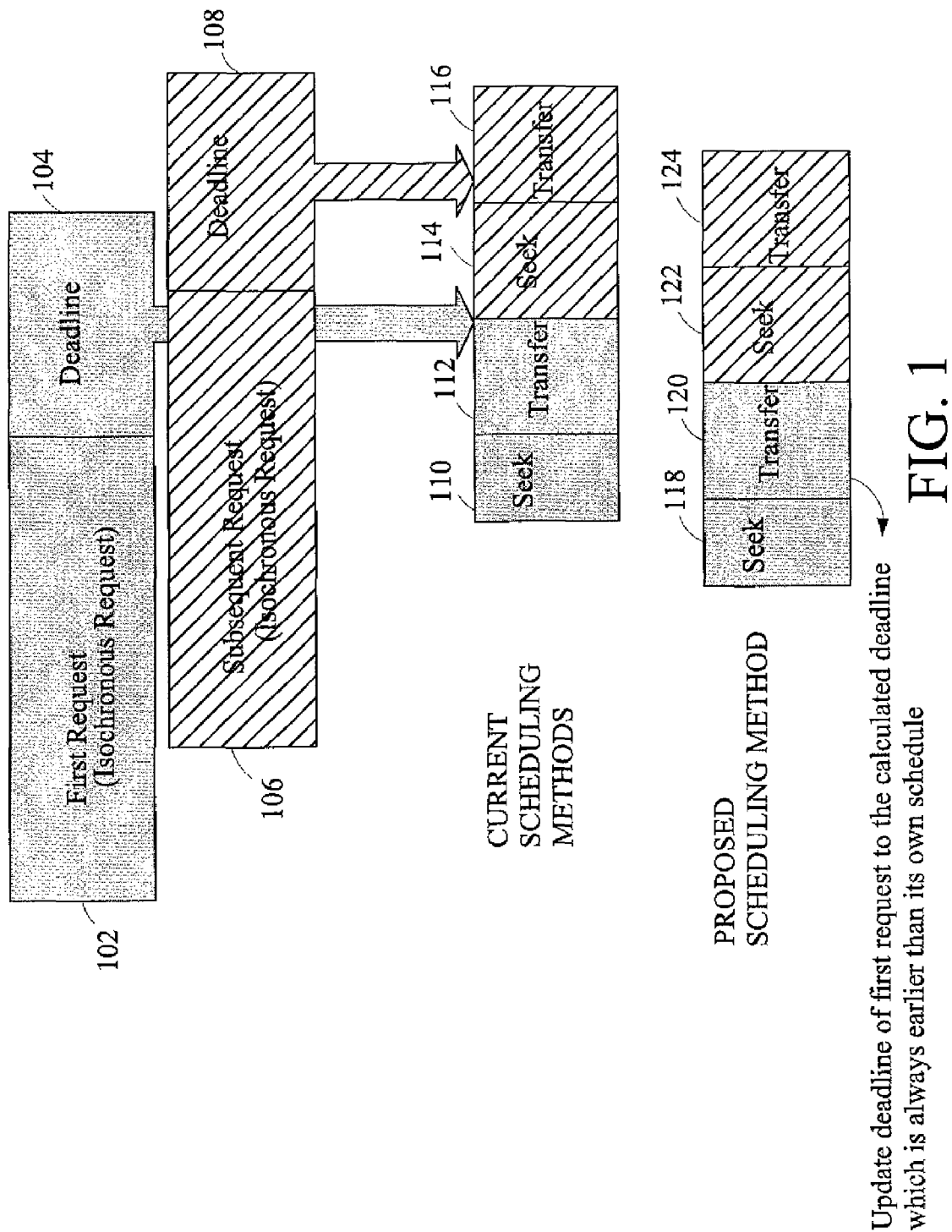
FIG. 1 is a block diagram illustrating a traditional scheduling method and a proposed scheduling method for handling conflicting deadlines by a disk drive.

FIG. 1 is a block diagram illustrating a traditional scheduling method and a proposed scheduling method (i.e., method provided by the present disclosure) for handling conflicting deadlines by a disk drive. The block 102 illustrates a first request, the first request being sent by an application for accessing a data on the disk drive. The block 104 represents a deadline for serving the first request. The deadline for serving the first request 102 comprises a seek time (represented by block 110) taken for seeking a data and a transfer time (represented by block 112) for transferring the data from the disk drive.

The block 106 illustrates a subsequent request, the subsequent request 106 being sent by another application for accessing the data on the disk drive. The subsequent request 106 can be for the same data on the disk drive as being requested by the first application or another data on the disk drive. The block 108 represents a deadline for serving the subsequent request 106. The deadline for serving the subsequent request 106 comprises a seek time (represented by block 114) for seeking the data by the subsequent request 106 and a transfer time (represented by block 116) for transferring the data from the disk drive.

In the traditional scheduling method, in case of a conflicting deadline, as shown in FIG. 1, when the deadline for serving the first request 104 overlaps with the deadline for serving the subsequent request 106, the subsequent request 106 has to wait till the first request 102 is served by the disk drive. Such delay results in a missed deadline of the subsequent request 106. For example, if the seek time 110 and the transfer time 112 occur after meeting the deadline of the first request 102, then the deadline of the subsequent request 106 is missed.

In the proposed scheduling method, i.e., in the method provided by the present disclosure, the disk drive has the physical information to make an estimate about the time taken for serving the first request 102 and the subsequent request 106. More specifically, the disk drive has physical information for serving the seek time 110 and the transfer time 112 of the first request, and the seek time 114 and the transfer time 116 of the subsequent request 106. Further, the source, for example, the application, does not have the information whether the deadline can be met or not. Once the disk drive checks that there is a potential deadline conflict as described above with reference to the first request 102 and the subsequent request 106, the disk drive determines the deadline for serving the first request 102 and the deadline for serving the subsequent request 106 and schedules the first request 102 prior to an actual schedule and serves the first request 102. The actual schedule is the schedule followed by the traditional methods. The subsequent request 106 is scheduled and served after the first request 102 is served, thereby handling the conflicting deadlines.

Figure 2:
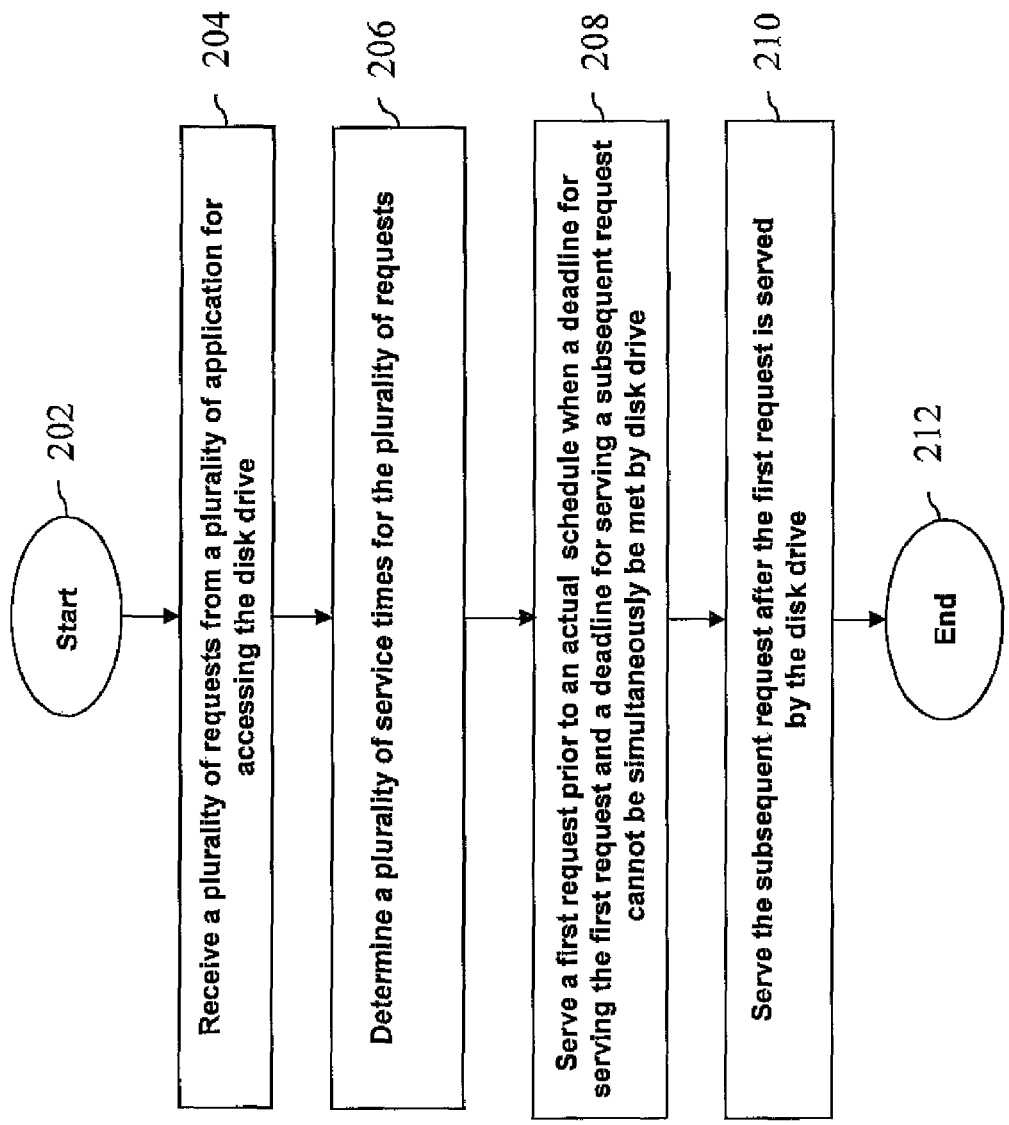
FIG. 2 is a flow diagram illustrating a method for handling conflicting deadlines by a disk drive, according to an exemplary embodiment of the present disclosure.

FIG. 2 is a flow diagram illustrating a method for handling conflicting deadlines by the disk drive. The method is initiated at 202. At 204, a plurality of requests from a plurality of applications for accessing the disk drive, is received by the disk drive. The plurality of requests is queued on a Serial Advanced Technology Attachment (SATA) interface. At 206, the disk drive determines a plurality of service times for the plurality of requests. As used herein, a service time of the plurality of service times specifies a deadline for serving a request of the plurality of requests, for example, the deadline 104 for serving the first request 102. As mentioned above, the service time comprises a seek time taken by an application for seeking the data on the disk drive and a transfer time taken by the application for transferring the data from the disk drive. At 208, the disk drive serves the first request 102 prior to the actual schedule, when the deadline 104 for serving the first request 102 and the deadline 108 for serving the subsequent request 106 of the plurality of requests cannot be simultaneously met. At 210, the disk drive serves the subsequent request 106 after the first request 102 is served, thereby handling the conflicting deadlines. The method terminates at 212.

The disclosure provides an isochronous extension to a Serial Advanced Technology Attachment (SATA) Standard protocol for improved disk performance for media. Additionally, the disclosure provides a solution for handling conflicting deadlines in an environment having a distributed control and an isolated knowledge. The distributed control and the isolated knowledge in the Personal Computer (PC) environment results in an increase in control of a platform.

Figure 3:
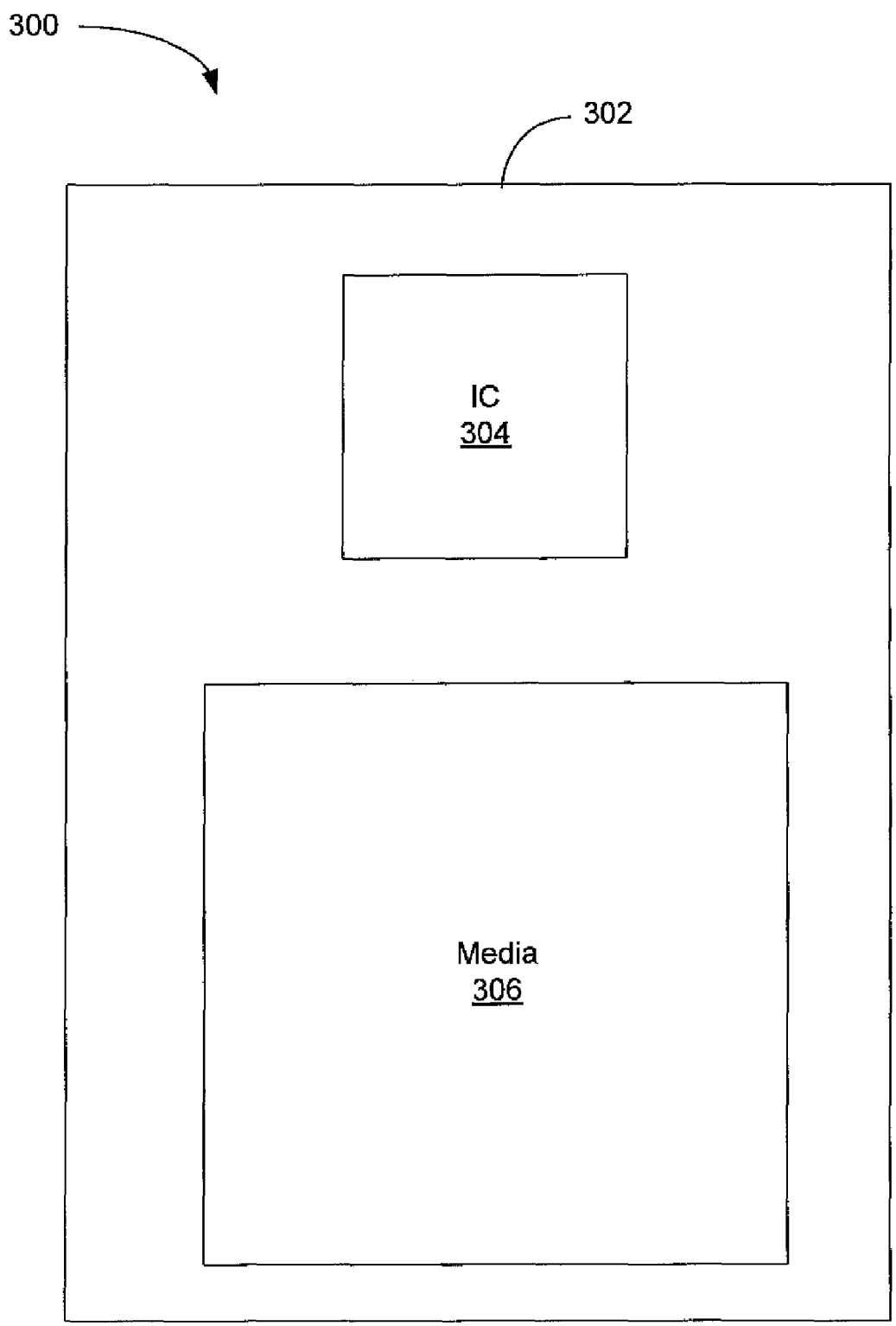
FIG. 3 is a block diagram of a disk drive device consistent with the present disclosure.

FIG. 3 depicts a disk drive device 300 consistent with the present disclosure. Disk drive device 300 may include an enclosure 302, an integrated circuit (IC) 304 and disk storage media 306. IC 304 may be configured to communicate with, for example, a host system using the aforementioned SATA communications protocol, as is understood in the art. Additionally, IC 304 may be configured to execute the scheduling methodology described above with reference to FIGS. 1 and/or 2. For example, IC 304 may be configured to handle conflicting deadlines of a plurality of requests received by the disk drive 300 from a plurality of applications. This may include, for example, determining a plurality of service times for the plurality of requests received by the disk drive, wherein a service time of the plurality of service times specifies a deadline for serving a request of the plurality of requests; serving a first request of the plurality of requests prior to an actual schedule when a deadline for serving the first request and a deadline for serving a subsequent request of the plurality of requests cannot be simultaneously met by the disk drive; and serving the subsequent request after the first request is served by the disk drive.

As used in any embodiment herein, an "integrated circuit" means a semiconductor device and/or microelectronic device, such as, for example, a semiconductor integrated circuit chip. As described above, the embodiments of the disclosure may be in the form of computer-implemented processes and apparatuses for practicing those processes. Embodiments of the disclosure may also be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the disclosure. The present disclosure can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method for handling conflicting deadlines by a disk drive, the method comprising:
    receiving a plurality of requests from a plurality of applications for accessing the disk drive, the plurality of requests comprising a first request and a subsequent request;
    determining a plurality of service times for the plurality of requests by the disk drive, wherein a service time of the plurality of service times specifies a deadline for serving the first request and a deadline for serving the subsequent request of the plurality of requests;
    determining an actual schedule for serving the first request and the second request;
    serving the first request of the plurality of requests prior to the actual schedule when a deadline for serving the first request and a deadline for serving the subsequent request of the plurality of requests cannot be simultaneously met by the disk drive using the actual schedule; and
    serving the subsequent request after the first request is served by the disk drive;
    wherein the deadline for serving the first request comprises at least one of a seek time for seeking data from the disk drive and a transfer time for transferring the data.

2. The method of claim 1, wherein each of the plurality of service times comprises a seek time and a transfer time.

3. The method of claim 1, wherein the plurality of requests are isochronous.

4. The method of claim 1, wherein the plurality of requests are queued on a Serial Advanced Technology Attachment (SATA) interface.

5. A non-transitory computer readable medium for handling conflicting deadlines by a disk drive, the non-transitory computer readable medium comprising a program module having instructions for:
    receiving a plurality of requests from a plurality of applications for accessing the disk drive, the plurality of requests comprising a first request and a subsequent request;
    determining a plurality of service times for the plurality of requests by the disk drive, wherein a service time of the plurality of service times specifies a deadline for serving the first request and a deadline for serving the subsequent request of the plurality of requests;
    determining an actual schedule for serving the first request and the second request;
    serving the first request of the plurality of requests prior to the actual schedule for serving the first request and the second request, when a deadline for serving the first request and a deadline for serving the subsequent request of the plurality of requests cannot be simultaneously met by the disk drive using the actual schedule; and
    serving the subsequent request after the first request is served by the disk drive;
    wherein the deadline for serving the first request comprises at least one of a seek time for seeking data from the disk drive and a transfer time for transferring the data.

6. The non-transitory computer readable medium of claim 5, wherein each of the plurality of service times comprises a seek time and a transfer time.

7. The non-transitory computer readable medium of claim 5, wherein the plurality of requests are isochronous.

8. The non-transitory computer readable medium of claim 5, wherein the plurality of requests are queued on a Serial Advanced Technology Attachment (SATA) interface.

9. A disk drive for handling conflicting deadlines of a plurality of requests received by the disk drive from a plurality of applications, the disk drive comprising architecture capable of:
    determining a plurality of service times for the plurality of requests received by the disk drive, wherein a service time of the plurality of service times specifies a deadline for serving a first request and a subsequent request of the plurality of requests;

determining an actual schedule for serving the first request and the second request;

serving the first request of the plurality of requests prior to an actual schedule for serving the first request and the second request, when a deadline for serving the first request and a deadline for serving the subsequent request of the plurality of requests cannot be simultaneously met by the disk drive using the actual schedule; and serving the subsequent request after the first request is served by the disk drive;

wherein the deadline for serving the first request comprises at least one of a seek time for seeking data from the disk drive and a transfer time for transferring the data.

10. The disk drive of claim 9, wherein each of the plurality of service times comprises a seek time and a transfer time.

11. The disk drive of claim 9, wherein the plurality of requests are isochronous.

12. The disk drive of claim 9, wherein the plurality of request are queued on a Serial Advanced Technology Attachment (SATA) interface.

* * * * *